United States Patent
Zhou et al.

(10) Patent No.: US 10,420,092 B2
(45) Date of Patent: Sep. 17, 2019

(54) RESOURCE ALLOCATION INFORMATION INDICATION METHOD, BASE STATION, AND USER EQUIPMENT

(71) Applicant: HUAWEI TECHNOLOGIES CO., LTD., Guangdong (CN)

(72) Inventors: Kaijie Zhou, Shenzhen (CN); Tianle Deng, Shanghai (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 0 days.

(21) Appl. No.: 15/846,996

(22) Filed: Dec. 19, 2017

(65) Prior Publication Data
US 2018/0146456 A1 May 24, 2018

Related U.S. Application Data (63) Continuation of application No. PCT/CN2015/082886, filed on Jun. 30, 2015.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04W 72/04* (2013.01);
(Continued)

(58) Field of Classification Search
CPC ..... H04W 72/04; H04W 88/02; H04W 88/08; H04L 5/0053; H04L 5/0007
See application file for complete search history.

(56) References Cited

U.S. PATENT DOCUMENTS

| 2015/0092647 A1 | 4/2015 | Tabet et al. |
| 2015/0189656 A1 | 7/2015 | Iwai et al. |
| 2016/0088594 A1* | 3/2016 | Xiong ............... H04W 4/70 370/329 |

FOREIGN PATENT DOCUMENTS

| CN | 101702823 A | 5/2010 |
| CN | 102036387 A | 4/2011 |

(Continued)

OTHER PUBLICATIONS

Giang T. Pham,"Integration of IEC 61850 MMS and LTE to support smart metering communications",University of Twente,Master Thesis,Aug. 2013,total 134 pages.
(Continued)

*Primary Examiner* — Kent T Krueger
(74) *Attorney, Agent, or Firm* — Kilpatrick Townsend & Stockton, LLP (57) ABSTRACT

Embodiments of the present disclosure provide a resource allocation information indication method, a base station, a user equipment, and a system. In technical solutions of the embodiments in accordance with the present disclosure, a base station generates and sends downlink control information that includes public resource allocation indication information to a UE, and the public resource allocation indication information is used to indicate resources allocated to multiple UEs. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the method is applied to a short-subframe service scenario, signaling overheads are further reduced and system performance is improved.

14 Claims, 4 Drawing Sheets

(51) Int. Cl.
*H04W 88/02* (2009.01)
*H04W 88/08* (2009.01)

(52) U.S. Cl.
CPC .......... *H04L 5/0007* (2013.01); *H04W 88/02* (2013.01); *H04W 88/08* (2013.01)

(56) References Cited

FOREIGN PATENT DOCUMENTS

| | | |
|---|---|---|
| CN | 102710405 A | 10/2012 |
| CN | 102893652 A | 1/2013 |
| CN | 103037511 A | 4/2013 |
| CN | 103095396 A | 5/2013 |
| CN | 103095444 A | 5/2013 |
| WO | 2013068834 A1 | 5/2013 |

OTHER PUBLICATIONS

Per Ljungberg,"Long term evolution for control system applications in a smart grid context",HYCON2 Workshop on Energy Sep. 2012,Ericsson,total 21 pages.
3GPP TSG RAN WG1 #81 R1-152831 ,"Reduction of DL Control Signaling for Low Cost UEs" Samsung ,May 25-29, 2015,total 4 pages.
3GPP TSG-RAN1#72bis R1-131051, "Control overhead reduction for small cell", ZTE, Apr. 15-9, 2013,total 4 pages.

\* cited by examiner

FIG. 1

S101. Generate downlink control information, where the downlink control information includes public resource allocation indication information, and the public resource allocation indication information is used to indicate resources allocated to multiple UEs that include a first UE S102. Send the downlink control information to the first UE, so that the UE obtains information about allocated resources according to the public resource allocation indication information

FIG. 2

S201. A UE receives downlink control information, where the downlink control information includes public resource allocation indication information, and the public resource allocation indication information is used to indicate resources allocated by a base station to multiple UEs that include the UE S202. The UE obtains information about allocated resources according to the public resource allocation indication

RESOURCE ALLOCATION INFORMATION INDICATION METHOD, BASE STATION, AND USER EQUIPMENT

CROSS-REFERENCE TO RELATED APPLICATIONS

This application is a continuation of International Application No. PCT/CN2015/082886, filed on Jun. 30, 2015, the disclosure of which is hereby incorporated by reference in its entirety.

TECHNICAL FIELD

Embodiments of the present disclosure relate to the field of wireless communications, and in particular, to a resource allocation information indication method, a base station, and a user equipment.

BACKGROUND

An uplink data transmission process in a Long Term Evolution (LTE) system mainly includes the following steps: First, a user equipment (user equipment, UE) sends a scheduling request (SR) message to a base station. Then, the base station sends scheduling grant (SG) information to the UE. The UE sends data by using resources allocated by the base station.

The SG information is transmitted by using downlink control information (downlink control information, DCI). The DCI generally includes a resource allocation indication bitmap, a modulation and coding scheme, and other information. After receiving the DCI, the UE may obtain information about the allocated resources by means of processing such as demodulation.

In the prior art, a bitmap in DCI sent by the base station to one UE is used to indicate only a resource allocation status of the UE, and some resources need to be occupied for sending each bitmap. As more UEs access the base station, total resources occupied by all bitmaps exponentially increase. An excessively large quantity of UEs results in excessively more system signaling overheads.

SUMMARY

Embodiments of the present disclosure provide a resource allocation information indication method, a base station, and a user equipment, so as to reduce system signaling overheads.

According to a first aspect, an embodiment of the present disclosure provides a resource allocation information indication method, including: generating downlink control information, where the downlink control information includes public resource allocation indication information, and the public resource allocation indication information is used to indicate resources allocated to multiple UEs that include a first UE; and sending the downlink control information to the first UE, so that the first UE obtains information about allocated resources according to the public resource allocation indication information.

In a first possible implementation of the first aspect, the public resource allocation indication information includes a character string including binary codes; the character string includes a first substring, the first substring is used to indicate the consecutive resources allocated to the first UE, and at least one consecutive bit included in the first substring represents the consecutive resources allocated to the first UE; and the character string further includes at least one second substring, the at least one second substring is used to indicate consecutive resources allocated to at least one UE other than the first UE, and at least one consecutive bit included in the second substring represents consecutive resources allocated to one UE in the at least one UE other than the first UE.

With reference to the first possible implementation of the first aspect, in a second possible implementation of the first aspect, the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

With reference to any one of the foregoing possible implementations, in a third possible implementation of the first aspect, when the public resource allocation information indication includes multiple second substrings, the multiple second substrings include alternate arrangement of a second substring including consecutive binary codes 1 and a second substring including consecutive binary codes 0.

With reference to any one of the foregoing possible implementations, in a fourth possible implementation of the first aspect, the method further includes: scrambling a cyclic redundancy check code of the downlink control information by using identification information of the first UE, so that the first UE demodulates the downlink control information, obtains the first substring corresponding to the first UE, and obtains, according to a mapping relationship between the first substring and the consecutive resources allocated to the first UE, information about the consecutive resources allocated to the first UE.

With reference to any one of the foregoing possible implementations, in a fifth possible implementation of the first aspect, that the public resource allocation indication information is used to indicate resources allocated to multiple UEs that include the first UE includes: the public resource allocation indication information is used to indicate a resource block group allocated to the first UE, and the resource block group includes at least one resource block.

With reference to the fifth possible implementation of the first aspect, in a sixth possible implementation of the first aspect, the method further includes: determining a length of the public resource allocation indication information, and the determining step includes: determining the length of the public resource allocation indication according to a size of the total resources allocated to the multiple UEs and a quantity of resource blocks included in the resource block group, where a quantity of UEs indicated by the public resource allocation indication is proportional to the length of the public resource allocation indication.

According to a second aspect, an embodiment of the present disclosure provides a resource allocation information obtaining method, including: receiving, by a UE, downlink control information, where the downlink control information includes public resource allocation indication information, and the public resource allocation indication information is used to indicate resources allocated by a base station to multiple UEs that include the UE; and obtaining, by the UE, information about allocated resources according to the public resource allocation indication.

In a first possible implementation of the second aspect, the public resource allocation indication includes a character string including binary codes; the character string includes a first substring, the first substring is used to indicate the consecutive resources allocated to the UE, and at least one consecutive bit included in the first substring represents the consecutive resources allocated to the UE; and the character string further includes at least one second substring, the at least one second substring is used to indicate consecutive resources allocated to at least one UE other than the UE, and at least one consecutive bit included in the second substring represents consecutive resources allocated to one UE in the at least one UE other than the UE.

With reference to the first possible implementation of the second aspect, in a second possible implementation of the second aspect, the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

With reference to any one of the foregoing possible implementations, in a third possible implementation of the second aspect, the obtaining, by the UE, information about allocated resources according to the public resource allocation indication includes: demodulating, by the UE, the downlink control information, obtaining the first substring corresponding to the UE, and obtaining, according to a mapping relationship between the first substring and the consecutive resources allocated to the UE, information about the consecutive resources allocated to the UE, where a cyclic redundancy check code of the downlink control information is scrambled by using identification information of the UE.

According to a third aspect, an embodiment of the present disclosure provides a base station, and the base station includes:

a generation unit, configured to generate downlink control information, where the downlink control information includes public resource allocation indication information, and the public resource allocation indication information is used to indicate resources allocated to multiple UEs that include the first UE; and a sending unit, configured to send the downlink control information to a user equipment UE, so that the first UE obtains information about allocated resources according to the public resource allocation indication information.

In a first possible implementation of the third aspect, the public resource allocation indication information includes a character string including binary codes; the character string includes a first substring, the first substring is used to indicate the consecutive resources allocated to the first UE, and at least one consecutive bit included in the first substring represents the consecutive resources allocated to the first UE; and the character string further includes at least one second substring, the at least one second substring is used to indicate consecutive resources allocated to at least one UE other than the first UE, and at least one consecutive bit included in the second substring represents consecutive resources allocated to one UE in the at least one UE other than the first UE.

With reference to the first possible implementation of the third aspect, in a second possible implementation of the third aspect, the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

With reference to any one of the foregoing possible implementations, in a third possible implementation of the third aspect, when the public resource allocation information indication includes multiple second substrings, the multiple second substrings include alternate arrangement of a second substring including consecutive binary codes 1 and a second substring including consecutive binary codes 0.

With reference to any one of the foregoing possible implementations, in a fourth possible implementation of the third aspect, the generation unit is further configured to scramble a cyclic redundancy check code of the downlink control information by using identification information of the first UE, so that the first UE demodulates the downlink control information, obtains the first substring corresponding to the first UE, and obtains, according to a mapping relationship between the substring corresponding to the first UE and an uplink resource, information about the uplink resource allocated to the first UE.

With reference to any one of the foregoing possible implementations, in a fifth possible implementation of the third aspect, that the public resource allocation indication information is used to indicate resources allocated to multiple UEs that include the first UE includes: the public resource allocation indication information is used to indicate a resource block group allocated to the first UE, and the resource block group includes at least one resource block.

With reference to the fifth possible implementation of the third aspect, in a sixth possible implementation of the third aspect, the generation unit is further configured to determine a length of the public resource allocation indication information, and the determining step includes: determining the length of the public resource allocation indication according to a size of the total resources allocated to the multiple UEs and a quantity of resource blocks included in the resource block group, where a quantity of UEs indicated by the public resource allocation indication is proportional to the length of the public resource allocation indication.

According to a fourth aspect, an embodiment of the present disclosure provides a UE, including: a receiving unit, configured to receive downlink control information, where the downlink control information includes public resource allocation indication information, and the public resource allocation indication information is used to indicate resources allocated to multiple UEs that include the UE; and a processing unit, configured to obtain information about allocated resources according to the public resource allocation indication.

In a first possible implementation of the fourth aspect, the public resource allocation indication includes a character string including binary codes; the character string includes a first substring, the first substring is used to indicate the consecutive resources allocated to the UE, and at least one consecutive bit included in the first substring represents the consecutive resources allocated to the UE; and the character string further includes at least one second substring, the at least one second substring is used to indicate consecutive resources allocated to at least one UE other than the UE, and at least one consecutive bit included in the second substring represents consecutive resources allocated to one UE in the at least one UE other than the UE.

With reference to the first possible implementation of the fourth aspect, in a second possible implementation of the fourth aspect, the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

With reference to any one of the foregoing possible implementations, in a third possible implementation of the fourth aspect, the processing unit is specifically configured to: demodulate the downlink control information, and obtain the first substring corresponding to the UE; and obtain, according to a mapping relationship between the first substring and the consecutive resources allocated to the UE, information about the consecutive resources allocated to the UE, where a cyclic redundancy check code of the downlink control information is scrambled by using identification information of the UE.

In technical solutions disclosed in the embodiments in accordance with the present disclosure, a base station generates and sends downlink control information that includes public resource allocation indication information to a UE, and the public resource allocation indication information is used to indicate resources allocated to multiple UEs. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the method is applied to a short-subframe service scenario, signaling overheads are further reduced and system performance is improved.

BRIEF DESCRIPTION OF DRAWINGS

To describe the technical solutions in the embodiments in accordance with the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Various technologies described in this specification may be used in a 4G communications system such as an LTE communications system, and in a next generation communications system such as an LTE-Advanced system.

A base station in the embodiments in accordance with the present disclosure may be an evolved NodeB (eNB/eNodeB) in the LTE communications system or a base-station-like device in the LTE-Advanced communications system.

A UE in accordance with the present disclosure may include a handheld device having a wireless communications function, an in-vehicle device, a wearable device, a computing device or another processing device connected to a wireless modem, and user equipments of various types, such as a mobile station (MS), a terminal, or terminal equipment. The terminal may communicate with one or more core networks by using a radio access network (RAN). For ease of description, the foregoing devices in the present disclosure are referred to as a user equipment or UE in this application.

In the embodiments in accordance with the present disclosure, a unidirectional communications link from a base station to a UE is defined as a downlink, and a unidirectional communications link from a UE to a base station is defined as an uplink.

Resources described in the embodiments in accordance with the present disclosure are transmission resources including time domain resources and frequency domain resources, and may be used to carry data or signaling in an uplink communication process or in a downlink communication process. That is, resources described in the embodiments in accordance with the present disclosure may be uplink resources allocated by a base station to a UE and used by the UE to send uplink data, or may be downlink resources allocated by a base station to a UE and used by the UE to receive downlink data.

With development of communications technologies, a user is imposing a stricter requirement for a data transmission rate. A communication manner is not limited to communication between people, and machine type communication (MTC) becomes increasingly popular.

Figure 1:
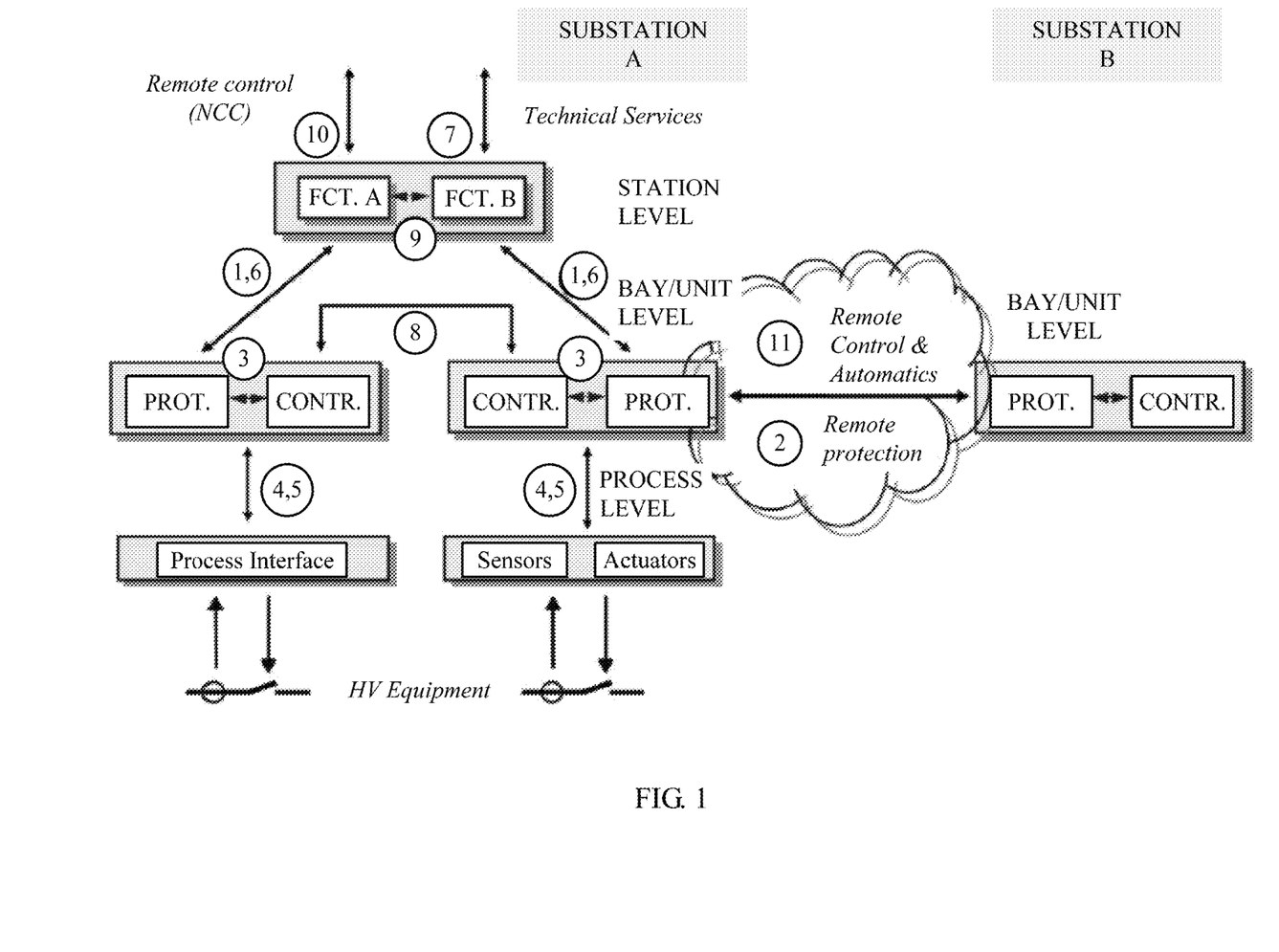
FIG. 1 is a schematic diagram of an architecture of a substation system.

FIG. 1 is a schematic diagram of an architecture of a substation system. As shown in FIG. 1, in the substation system, communication between a protection unit (PROT.) and a control unit (CONTR.) by using an interface 3, communication between one control unit (CONTR.) and another control unit (CONTR.) by using an interface 8, and communication between a process interface (process interface) and a control unit (CONTR.) by using an interface 5 all require that a delay be less than 3 milliseconds. In addition, other MTC applications such as intelligent traffic and monitoring in mines and oil fields also need a relatively short communications delay.

It may be understood that a communication process between devices in the foregoing MTC is similar to a communication process between a UE and a network element such as a base station in a wireless communications network. Therefore, the technical solutions provided in the embodiments in accordance with the present disclosure are applicable to the foregoing various MTC application scenarios.

In the embodiments in accordance with the present disclosure, an LTE system is used for description. The technical solutions provided in the embodiments in accordance with the present disclosure are applied to another communications system or MTC in a manner similar to that in the LTE system, and details are not described herein.

To meet the short-delay communication requirement, on the basis of a subframe with 1 ms duration in the LTE system, multiple orthogonal frequency division multiplexing (OFDM) symbols may be used to form a short subframe to transmit signaling or data. Duration of a short subframe is less than 1 ms. By using the short subframe, a transmit end sends data with a shorter time, and a receive end also demodulates data with a shorter time, so that an overall data transmission delay may be shortened.

In the LTE system, a minimum unit for carrying physical layer data may be a resource element (RE). An RE may include a subcarrier in a frequency domain and a symbol in a time domain. A unit for carrying the physical layer data may further include, for example, a resource block (RB). One RB may occupy both frequency domain resources of multiple consecutive subcarriers and time domain resources of multiple consecutive symbols. That is, a quantity of total resources occupied by one RB (unit: RE)=frequency domain resource×time domain resource. It is assumed that three OFDM symbols form a short subframe. That is, the short subframe occupies time domain resources of three symbols. If an RB corresponding to the short subframe occupies frequency domain resources of 12 subcarriers, a quantity of total resources is 36 REs. A base station may allocate transmission resources to a UE in a form of a resource block group (RBG). Each RBG includes at least one RB.

The base station may add a bitmap to DCI, so as to inform a UE of a resource allocation status of the UE. The DCI is transmitted by using a physical downlink common control channel (physical downlink common control channel, PDCCH).

Specifically, the DCI is transmitted in a control channel element (CCE) on the PDCCH. One CCE includes nine resource element groups (resource element group, REG). Each resource element group includes four REs. A quantity of CCEs required by DCI varies with a length of the DCI. The eNB may select a proper PDCCH format according to a channel status of the UE and a length of the DCI. As shown in Table 1, currently, the LTE system supports four PDCCH formats. PDCCHs with different formats may carry DCI with different lengths, or carry different quantities of DCI. For example, if a length of DCI is less than 72 bits, the DCI may be sent by using a PDCCH format 0; or if a length of DCI is greater than 72 bits and less than 144 bits, the DCI may be sent by using a PDCCH format 1. A quantity of bits in DCI is obtained by means of quadrature phase shift keying (QPSK) modulation and channel encoding.

TABLE 1

| PDCCH format | Quantity of CCEs | Quantity of REs | Quantity of bits in DCI |
| --- | --- | --- | --- |
| 0 | 1 | 36 | 72 |
| 1 | 2 | 72 | 144 |
| 2 | 4 | 144 | 288 |
| 3 | 8 | 288 | 576 |

When multiple UEs simultaneously access the base station, the base station separately delivers, to different UEs, multiple pieces of DCI carrying different bitmaps. Each UE receives one DCI. Each bitmap is used to indicate a resource allocation status of one UE. Because each bitmap occupies some resources, total resources occupied by the multiple bitmaps exponentially increase. An LTE system with a bandwidth of 10 MHz is used as an example, and downlink transmission resources provided by the base station are 50 RBs in total. If three RBs form one RBG, a length of each bitmap is 17 bits (50/3). If five UEs simultaneously access the base station, a length of all bitmaps is 85 bits (17×5). Because a length of a message is proportional to a quantity of resources occupied by the message, total resources occupied by all bitmaps increase. Consequently, relatively large system control signaling has overheads. Particularly, in a short-delay service, a data packet of an application is usually relatively small, and only several RBs are usually used for transmission. Therefore, overheads of each piece of DCI are greater than those of DCI used in a common-delay service, and the system control signaling overheads further increase because of bitmaps that occupy relatively more resources.

Figure 2:
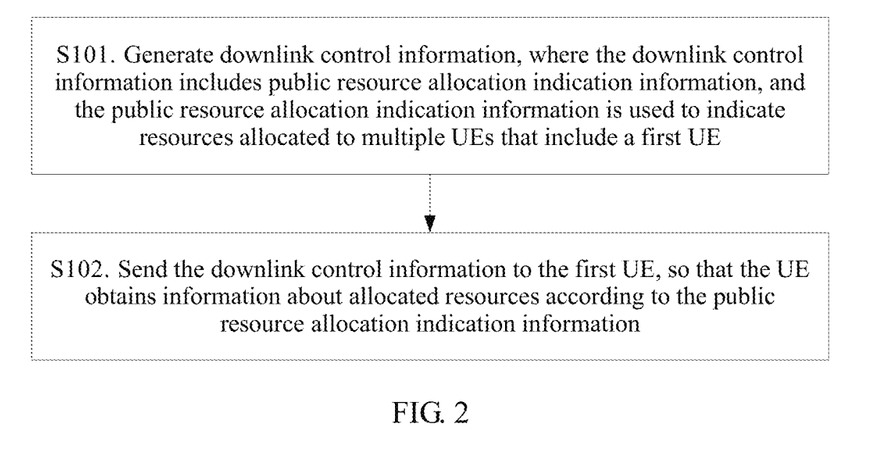
FIG. 2 is a schematic flowchart of a resource allocation information indication method according to an embodiment of the present disclosure.

FIG. 2 is a resource allocation information indication method according to an embodiment of the present disclosure, and the method includes steps S101 and S102. The method may be performed by a base station, for example, an eNB.

S101. Generate DCI, where the DCI includes public resource allocation indication information, and the public resource allocation indication information is used to indicate resources allocated to multiple UEs that include a first UE.

Resources allocated to a UE include time domain resources and frequency domain resources allocated to the UE. The resources may be uplink resources or downlink resources.

Optionally, the public resource allocation indication information may be used to indicate resource block groups allocated to the multiple UEs, and the resource block group includes at least one resource block. That is, the base station may allocate the foregoing resources to the UE in a form of an RBG, or may allocate the foregoing resources in another form, and this is not particularly limited in this embodiment of the present disclosure.

Specifically, DCI received by each UE includes information such as public resource allocation indication information, modulation and coding scheme (MSC) information, and a hybrid automatic repeat request (HARQ) process number. Each UE receives same public resource allocation indication information, that is, the public resource allocation indication information includes resource information of all the UEs served by the base station. Information such as MSC and the HARQ process number is particularly set for a UE that receives the DCI, that is, this type of information received by each UE varies in content.

S102. Send the DCI to the first UE, so that the first UE obtains information about allocated resources according to the public resource allocation indication information.

The information about the resources may include information such as a quantity of resources allocated to the UE, for example, a quantity of resource block groups, and a logical location of the resources, for example, a sequence number, in total resources, of a resource block group received by the UE.

Optionally, in an embodiment of the present disclosure, the public resource allocation indication information includes a character string including binary codes. The character string includes a first substring. The first substring is used to indicate the consecutive resources allocated to the first UE. At least one consecutive bit included in the first substring represents the consecutive resources allocated to the first UE. The character string further includes at least one second substring. The at least one second substring is used to indicate consecutive resources allocated to at least one UE other than the first UE. At least one consecutive bit included in the second substring represents consecutive resources allocated to one UE in the at least one UE other than the first UE.

Optionally, the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

Optionally, when the public resource allocation indication information includes multiple second substrings, the multiple second substrings include alternate arrangement of a second substring including consecutive binary codes 1 and a second substring including consecutive binary codes 0.

In other words, the character string in the foregoing public resource allocation indication information may include alternate arrangement of a substring including consecutive binary codes 1 and a substring including consecutive binary codes 0. Conversion of the substring including the binary codes 1 and the substring including the binary codes 0 indicates that corresponding resources are allocated to different UEs.

It may be understood that the base station may allocate resources to any UE that accesses the base station. Therefore, the first UE may be any UE to which resources are allocated by the base station, and does not represent a particular UE. This imposes no limitation on the present disclosure.

It may be understood that the first substring and the second substring are named only for indicating and distinguishing between resources allocated to different UEs. This does not impose limitation on a sorting order and a quantity of substrings.

It should be noted that the first substring or the second substring correspond to consecutive resources in logic. That is, the first substring or the second substring may correspond to consecutive physical resources, or according to a mapping relationship, may correspond to non-consecutive physical resources. Both the consecutive resources and the non-consecutive resources may be represented by using consecutive numbers, such as a first RBG, a second RBG, . . . , and an $n^{th}$ RBG (N is an integer and N>0).

Optionally, in an embodiment of the present disclosure, the base station may scramble a cyclic redundancy check (CRC) code of the DCI by using identification information of the first UE, so that the first UE can demodulate the corresponding DCI, obtain the first substring corresponding to the first UE, and obtain, according to a mapping relationship between the first substring and the consecutive resources allocated to the first UE, information about the consecutive resources allocated to the first UE.

It may be understood that the foregoing method for obtaining corresponding DCI according to identification information of a UE is applicable to an uplink resource allocation process or a downlink resource allocation process.

A mapping relationship between public resource allocation indication information and indicated resources may be an arbitrary mapping relationship, and this is not limited in this embodiment. For example, the public resource allocation indication information may be used to indicate a virtual resource block (VRB), and a virtual resource block may represent a physical resource block (PRB), so that the public resource allocation indication information may be mapped to a physical resource block.

Optionally, the identification information of the UE may be a radio network temporary identifier (RNTI) such as a cell radio network temporary identifier (C-RNTI), which is used to identify a UE on a common channel in a cell. Each UE has a unique matching C-RNTI in a cell, and the C-RNTI may be used to distinguish between different UEs. Specifically, when dedicated logical channel data of the UE is carried on the common channel in the cell, the C-RNTI may be added to a header of a protocol data unit (PDU) at a Medium Access Control (MAC) layer and serve as a special identifier to distinguish between different UEs. A length of the C-RNTI is usually 16 bits.

Optionally, in another embodiment, when the base station allocates resources to the UE in a resource block manner, the base station may determine a length of the public resource allocation indication according to a size of the total resources allocated to multiple UEs and a quantity of resource blocks included in the resource block group. A quantity of UEs indicated by the public resource allocation indication is proportional to the length of the public resource allocation indication.

Specifically, the length of the public resource allocation indication information=a quantity of downlink resources/a quantity of resources in a resource block group. An LTE system with a bandwidth of 10 M is used as an example, and downlink transmission resources are 50 RBs in total. If the base station delivers the resources in an RBG manner, and each RBG includes three RBs, a length of the public resource allocation indication information is 50/3≈17 bits. In addition, a system bandwidth determines a maximum quantity of UEs that can access a base station. The foregoing system is still used as an example. If the base station allocates two RBGs to each UE, each UE can obtain six RBs by means of allocation, and a total quantity of UEs that can be carried is 50/6≈8.

According to the resource allocation information indication method provided in this embodiment in accordance with the present disclosure, a base station generates and sends DCI that includes public resource allocation indication information to a UE, and the public resource allocation indication information is used to indicate resources allocated to multiple UEs. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the method is applied to a short-subframe service scenario, signaling overheads are further reduced and system performance is improved.

Figure 3:
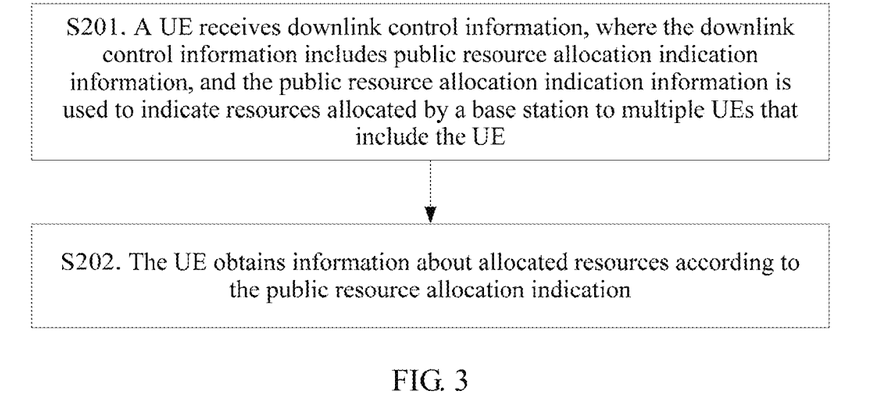
FIG. 3 is a schematic flowchart of a resource allocation information obtaining method according to an embodiment of the present disclosure.

As shown in FIG. 3, an embodiment in accordance with the present disclosure further provides a resource allocation information obtaining method, and the method includes steps S201 and S202.

S201. A UE receives DCI sent by a base station, where the DCI includes public resource allocation indication information, and the public resource allocation indication information is used to indicate resources allocated to multiple UEs that include the UE.

S202. The UE obtains information about allocated resources according to the public resource allocation indication information.

Optionally, in an embodiment of the present disclosure, the public resource allocation indication information includes a character string including binary codes. The character string includes a first substring and at least one second substring. The first substring is used to indicate the consecutive resources allocated to the UE. The at least one second substring is used to indicate consecutive resources allocated to at least one UE other than the UE. For specific description of the character string, refer to related content of the embodiment shown in FIG. 2. Details are not described herein again.

Optionally, in an embodiment of the present disclosure, that the UE obtains information about allocated resources according to the public resource allocation indication includes: demodulating, by the UE, the DCI, obtaining the first substring corresponding to the UE, and obtaining, according to a mapping relationship between the first substring and the consecutive resources allocated to the UE, information about the consecutive resources allocated to the UE. A CRC code of the DCI is scrambled by using identification information of the UE.

Specifically, the base station may send multiple pieces of DCI to multiple UEs by using a segment of resources including same time domain resources and consecutive frequency domain resources. A CRC code of each piece of DCI is scrambled by using identification information of a particular UE. Therefore, the UE may demodulate corresponding DCI to obtain content of the public resource allocation indication, and then determine a location and content of the first substring according to a correspondence between a DCI number and the first substring, so as to determine the information about the allocated resources according to the mapping relationship between the first substring and the indicated resources.

The base station and the UE may agree upon a DCI number according to a numbering rule, and the numbering rule may be a logical mapping method. For example, a number is determined according to a logical sequence of sending each piece of DCI, or a number is determined according to a sequence of a physical location of resources indicated by each piece of DCI. The numbering rule is not particularly limited in this embodiment of the present disclosure.

Optionally, the number may be directly added to the DCI and obtained by the UE, or the number may be obtained by the UE by means of calculation according to information carried in the DCI.

The substrings in the public resource allocation indication information have a sorting order, so that the UE can find the matched first substring according to a DCI number, that is, determine a location of the first substring in the public resource allocation indication information, to obtain information about the corresponding resources.

Figure 4:
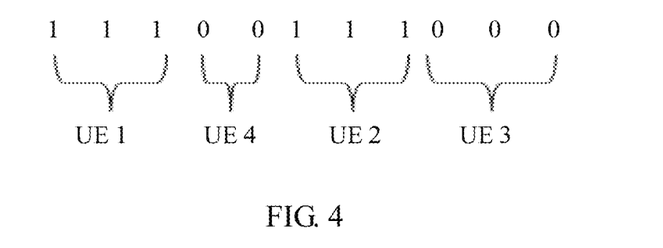
FIG. 4 is a schematic diagram of public resource allocation indication information according to an embodiment of the present disclosure.

Specific public resource allocation indication information is used as an example for description. As shown in FIG. 4, the public resource allocation indication information includes 11 bits, and a character string in the public resource allocation indication information includes a total of four substrings: "111", "00", "111", and "000", recorded as a substring 1, a substring 2, a substring 3, and a substring 4 respectively according to a sorting order of the character string. The four substrings respectively indicate resources allocated to four different UEs, that is, each UE obtains a group of resources by means of allocation.

It is assumed that the four different UEs herein are UE 1, UE 2, UE 3, and UE 4, and the base station sends DCI 1, DCI 2, DCI 3, and DCI 4 to the UE 1 to UE 4 respectively. It is assumed that numbers of the four DCI are 1, 2, 3, and 4, and resources are allocated in an RBG manner. Each UE may demodulate corresponding DCI according to scrambling information of a CRC code of the DCI; obtain content of the public resource allocation indication information; obtain, according to a correspondence between a DCI number and a substring, a substring indicating an allocated RBG; and determine the allocated RBG according to a mapping relationship between each substring and resources. As shown in FIG. 4, the UE 1 obtains three RBGs by means of allocation, the UE 2 obtains two RBGs by means of allocation, the UE 3 obtains three RBGs by means of allocation, and the UE 4 obtains three RBGs by means of allocation. In addition, logical locations of corresponding RBGs can be obtained. The UE 1 is used as an example. The UE 1 identifies that a CRC code of DCI 1 is scrambled by a C-RNTI of the UE 1, that is, identifies that the DCI 1 is sent to the UE 1, so that the UE 1 may demodulate the DCI 1 to obtain the public resource allocation indication information in the DCI. The substring 1 matches a DCI 1 number, so that the UE 1 determines that consecutive RBGs corresponding to the substring 1 "111" are allocated to the UE 1, and obtains information about the first to the third consecutive RBGs.

It may be understood that if there are different numbering rules, the base station may correspondingly adjust content in each character string in the public resource allocation indication information and the indicated resource, to ensure that each substring can indicate a resource allocation status of a corresponding UE. For example, if numbers of the DCI 1 to DCI 4 are 4, 3, 2, and 1, the public resource allocation indication information may be adjusted to "00011100111" or "11100011000", and the substring 1 indicates a resource allocation status of the UE 4, and the substring 2 indicates a resource allocation status of the UE 3, . . . . If the DCI 1 is still sent to the UE 1, the UE 1 obtains the substring 4 by means of matching according to the DCI number. Resources indicated by the substring 4 are still allocated by the base station to the UE 1, so as to avoid wrong indication caused by a change in the numbering rule.

Figure 5:
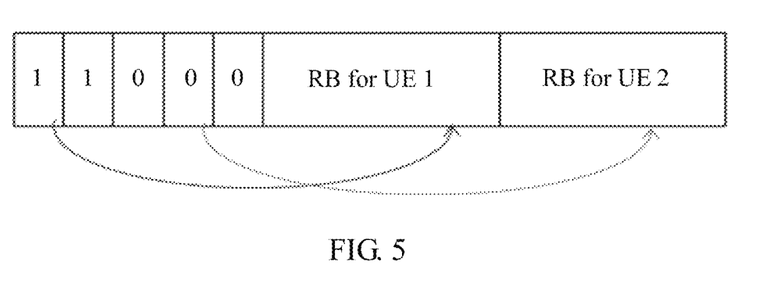
FIG. 5 is a schematic diagram of downlink public resource allocation indication information according to an embodiment of the present disclosure.

Optionally, in another embodiment in accordance with the present disclosure, when the UE receives downlink data, a CRC code of the downlink data is scrambled by using a C-RNTI of the UE. The UE first obtains an RBG allocation manner by using the public resource allocation indication information, and then demodulates data. Because a CRC code of data is scrambled by using a C-RNTI of one UE, the UE can demodulate only the data sent to the UE. As shown in FIG. 5, the UE 1 knows that the first to the second consecutive RBGs are allocated to one UE, and the third to the fifth consecutive RBGs are allocated to another UE. Therefore, the UE 1 first demodulates data in the first to the second consecutive RBGs. A CRC code of the data is scrambled by a C-RNTI of the UE 1, so that the UE 1 can receive the data. Similarly, a CRC code of data in the third to the fifth consecutive RBGs is scrambled by a C-RNTI of the UE 2, so that the UE 2 can demodulate and receive the data. It may be understood that after determining the data allocated to the UE 1, the UE 1 does not need to demodulate data on another resource.

In this embodiment, DCI sent by the base station to each UE may include only public resource allocation indication information, other information such as MSC information may be configured in the UE in advance, and information such as a HARQ process number may be omitted, so that an entire length of the DCI is shortened, and signaling overheads are further reduced.

The resource allocation information obtaining method provided in this embodiment is a method at a receive end corresponding to the embodiments shown in FIG. 2 and FIG. 3. For detailed description of this embodiment, refer to related content of the embodiment shown in FIG. 2.

According to the resource allocation information obtaining method provided in this embodiment in accordance with the present disclosure, a UE receives DCI that includes public resource allocation indication information and that is sent by a base station, and the public resource allocation indication information is used to indicate resources allocated to multiple UEs that include the UE. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the method is applied to a short-subframe service scenario, signaling overheads are further reduced and system performance is improved.

Figure 6:
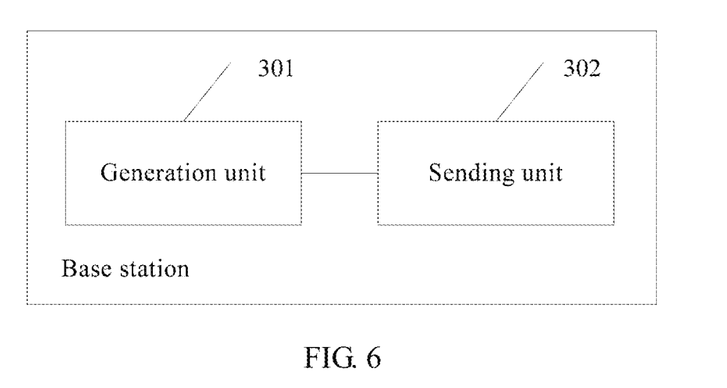
FIG. 6 is a schematic structural diagram of a base station according to an embodiment of the present disclosure.

FIG. 6 is a schematic structural diagram of a base station according to an embodiment of the present disclosure.

As shown in FIG. 6, the base station includes a generation unit 301 and a sending unit 302.

The generation unit 301 is configured to generate DCI. The DCI includes public resource allocation indication information, and the public resource allocation indication information is used to indicate resources allocated to multiple UEs that include a first UE.

The sending unit 302 is configured to send the DCI to the first UE, so that the first UE obtains information about allocated resources according to the public resource allocation indication information.

Optionally, in an embodiment of the present disclosure, the public resource allocation indication information includes a character string including binary codes. The character string includes a first substring and at least one second substring. The first substring is used to indicate the consecutive resources allocated to the first UE. The at least one second substring is used to indicate consecutive resources allocated to at least one UE other than the first UE. For specific description of the character string, refer to related content in other embodiments of the present disclosure. Details are not described herein again.

Optionally, the generation unit 301 may be further configured to scramble a CRC code of the DCI by using identification information of the first UE, so that the first UE can demodulate the corresponding DCI, obtain the first substring corresponding to the first UE, and obtain, according to a mapping relationship between the first substring and the consecutive resources allocated to the first UE, information about the consecutive resources allocated to the first UE. For a specific process of obtaining resource information, refer to related description in other embodiments of the present disclosure. Details are not described herein again.

Optionally, in another embodiment of the present disclosure, when the base station allocates resources to the UE in a resource block manner, the generation unit 301 may be further configured to determine a length of the public resource allocation indication according to a size of the total resources allocated to multiple UEs and a quantity of resource blocks included in a resource block group. A quantity of UEs indicated by the public resource allocation indication is proportional to the length of the public resource allocation indication. For a specific determining process, refer to related description in other embodiments of the present disclosure. Details are not described herein again.

Optionally, in another embodiment of the present disclosure, a function of the generation unit 301 may be implemented by a processor.

Optionally, in another embodiment of the present disclosure, a function of the sending unit 302 may be implemented by a transmitter.

According to the base station provided in this embodiment of the present disclosure, DCI that includes public resource allocation indication information is generated and sent to a UE, and the public resource allocation indication information is used to indicate resources allocated to multiple UEs. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the base station is applied to a short-subframe service scenario, signaling overheads are further reduced and system performance is improved.

Figure 7:
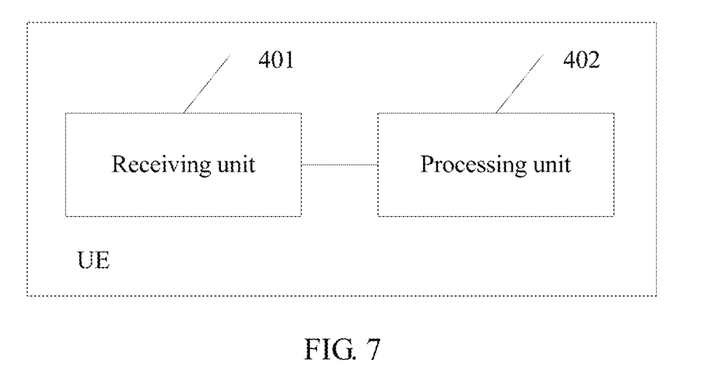
FIG. 7 is a schematic structural diagram of a UE according to an embodiment of the present disclosure.

FIG. 7 is a schematic structural diagram of a UE according to an embodiment of the present disclosure.

As shown in FIG. 7, the UE includes a receiving unit 401 and a processing unit 402.

The receiving unit 401 is configured to receive DCI. The DCI includes public resource allocation indication information, and the public resource allocation indication information is used to indicate resources allocated to multiple UEs that include the UE.

The processing unit 402 is configured to obtain information about allocated resources according to the public resource allocation indication.

Optionally, in an embodiment of the present disclosure, the public resource allocation indication information includes a character string including binary codes. The character string includes a first substring and at least one second substring. The first substring is used to indicate the consecutive resources allocated to the UE. The at least one second substring is used to indicate consecutive resources allocated to at least one UE other than the UE. For specific description of the character string, refer to related content of the embodiment shown in FIG. 2. Details are not described herein again.

Optionally, in an embodiment of the present disclosure, the processing unit 402 is specifically configured to: demodulate the DCI, and obtain the first substring corresponding to the UE; and obtain, according to a mapping relationship between the first substring and the consecutive resources allocated to the UE, information about the consecutive resources allocated to the UE. A CRC code of the DCI is scrambled by using identification information of the UE.

Specifically, the UE may demodulate corresponding DCI to obtain content of the public resource allocation indication, and then determine a location and content of the first substring according to a correspondence between a DCI number and the first substring, so as to determine the information about the allocated resources according to the mapping relationship between the first substring and the indicated resources. For specific description of the correspondence between a DCI number and the first substring and how the UE determines the information about the allocated resources, refer to other embodiments of the present disclosure, for example, content related to FIG. 4. Details are not described herein again.

Optionally, in another embodiment of the present disclosure, when the receiving unit 401 receives downlink data, a CRC code of the downlink data is scrambled by a C-RNTI of the UE. For a process of obtaining downlink data resource information, refer to content related to FIG. 5. Details are not described herein again.

Optionally, in another embodiment of the present disclosure, a function of the receiving unit 401 may be implemented by a receiver.

Optionally, in another embodiment of the present disclosure, a function of the processing unit 402 may be implemented by a processor.

According to the UE provided in this embodiment in accordance with the present disclosure, DCI that includes public resource allocation indication information sent by a base station is received, and the public resource allocation indication information is used to indicate resources allocated to multiple UEs that include the UE. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the UE is applied to a short-subframe service scenario, signaling overheads are further reduced and system performance is improved.

Figure 8:
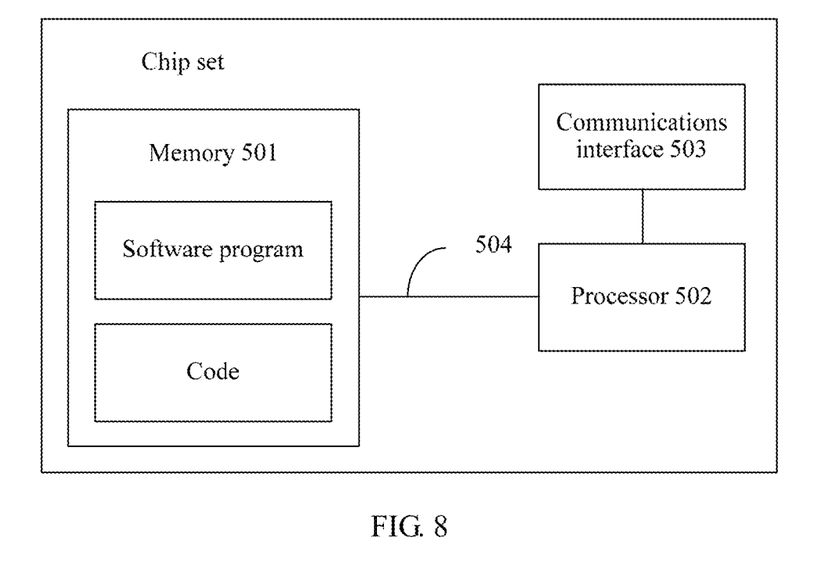
FIG. 8 is a schematic structural diagram of a chip set according to an embodiment of the present disclosure.

As shown in FIG. 8, an embodiment of the present disclosure further provides a chip set. The chip set includes a processor 501, a memory 502, a communications interface 503, and a system bus 504. The processor 501, the memory 502, and the communications interface 503 are connected by using the system bus 504 to complete mutual communication.

When the chip set is working, the processor 501 and the memory 502 may perform a resource allocation information indication method The method specifically includes the following steps: The memory 502 stores a group of program code, and the processor 501 is configured to invoke the program code stored in the memory 502, to perform the following operations: generating downlink control information, where the downlink control information includes public resource allocation indication information, and the public resource allocation indication information is used to indicate resources allocated to multiple UEs that include a first UE; and sending the downlink control information to the first UE, so that the first UE obtains information about allocated resources according to the public resource allocation indication information.

Optionally, in an embodiment of the present disclosure, the public resource allocation indication information includes a character string including binary codes. The character string includes a first substring and at least one second substring. The first substring is used to indicate the consecutive resources allocated to the first UE. The at least one second substring is used to indicate consecutive resources allocated to at least one UE other than the first UE. For specific description of the character string, refer to related content in other embodiments of the present disclosure. Details are not described herein again.

Optionally, the memory 502 may further store a group of program code, and the processor 501 is configured to invoke the program code stored in the memory 502, to perform the following operation: scrambling a CRC code of the DCI by using identification information of the first UE, so that the UE can demodulate the corresponding DCI, obtain the first substring corresponding to the first UE, and obtain, according to a mapping relationship between the first substring and the consecutive resources allocated to the first UE, information about the consecutive resources allocated to the first UE. For a specific process of obtaining resource information, refer to related description in other embodiments of the present disclosure. Details are not described herein again.

Optionally, in another embodiment of the present disclosure, the memory 502 may further store a group of program code, and the processor 501 is configured to invoke the program code stored in the memory 502, to perform the following operation: determining a length of the public resource allocation indication according to a size of the total resources allocated to the multiple UEs and a quantity of resource blocks included in a resource block group. A quantity of UEs indicated by the public resource allocation indication is proportional to the length of the public resource allocation indication. For a specific determining process, refer to related description in other embodiments of the present disclosure. Details are not described herein again.

It may be understood that the chip set may be installed in a base station or a similar device.

According to the chip set provided in this embodiment of the present disclosure, DCI that includes public resource allocation indication information is generated and sent to a UE, and the public resource allocation indication information is used to indicate resources allocated to multiple UEs. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the chip set is applied to a short-subframe service scenario, signaling overheads are further reduced and system performance is improved.

Figure 9:
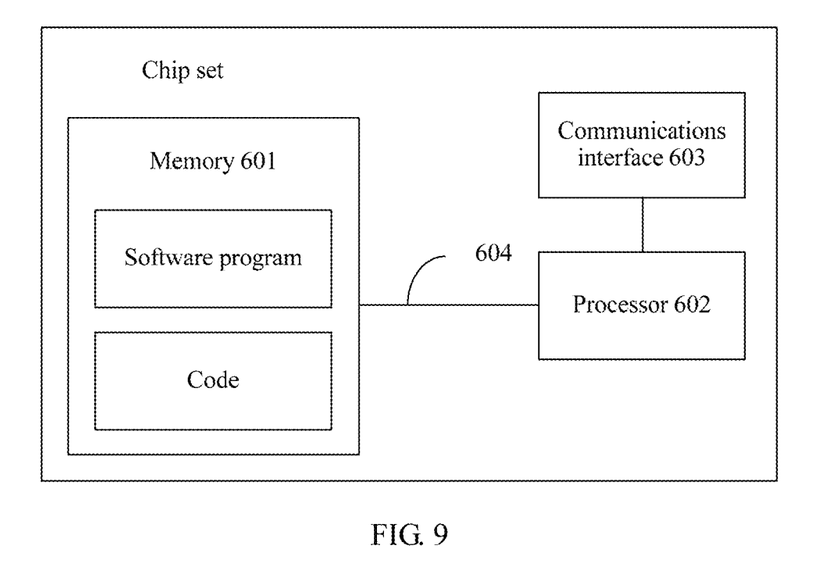
FIG. 9 is a schematic structural diagram of a chip set according to an embodiment of the present disclosure.

As shown in FIG. 9, an embodiment of the present disclosure further provides a chip set. The chip set includes a processor 601, a memory 602, a communications interface 603, and a system bus 604. The processor 601, the memory 602, and the communications interface 603 are connected by using the system bus 604 to complete mutual communication.

When the chip set is working, the processor 601 and the memory 602 may perform a resource allocation information obtaining method. The method specifically includes the following steps: The memory 602 stores a group of program code, and the processor 601 is configured to invoke the program code stored in the memory 602, to perform the following operations: receiving downlink control information, where the downlink control information includes public resource allocation indication information, and the public resource allocation indication information is used to indicate resources allocated to multiple UEs that include a UE; and obtaining information about allocated resources according to the public resource allocation indication.

Optionally, in an embodiment in accordance with the present disclosure, the public resource allocation indication information includes a character string including binary codes. The character string includes a first substring and at least one second substring. The first substring is used to indicate the consecutive resources allocated to the UE. The at least one second substring is used to indicate consecutive resources allocated to at least one UE other than the UE. For specific description of the character string, refer to related content in other embodiments of the present disclosure. Details are not described herein again.

Further, that the UE obtains information about allocated resources according to the public resource allocation indication includes: demodulating, by the UE, the downlink control information, obtaining the first substring corresponding to the UE, and obtaining, according to a mapping relationship between the first substring and the consecutive resources allocated to the UE, information about the consecutive resources allocated to the UE. A cyclic redundancy check code of the downlink control information is scrambled by using identification information of the UE.

Specifically, the UE may demodulate corresponding DCI to obtain content of the public resource allocation indication, and then determine a location and content of the first substring according to a correspondence between a DCI number and the first substring, so as to determine the information about the allocated resources according to the mapping relationship between the first substring and the indicated resources. For specific description of the correspondence between a DCI number and the first substring and how the UE determines the information about the allocated resources, refer to other embodiments of the present disclosure, for example, content related to FIG. 4. Details are not described herein again.

Optionally, in another embodiment of the present disclosure, when downlink data is being received, a CRC code of the downlink data is scrambled by a C-RNTI of the UE. For a process of obtaining downlink data resource information, refer to content related to FIG. 5. Details are not described herein again.

It may be understood that the chip set may be installed in a UE or a similar device.

According to the chip set provided in this embodiment of the present disclosure, DCI that includes public resource allocation indication information sent by a base station is received, and the public resource allocation indication information is used to indicate resources allocated to multiple UEs that include a UE. The UE obtains information about allocated resources according to the public resource allocation indication information. Therefore, a quantity of resources occupied by a resource allocation indicator is reduced, a quantity of resources occupied by entire DCI is reduced, and system signaling overheads are reduced. Particularly, when the chip set is applied to a short-subframe service scenario, signaling overheads are further reduced and system performance is improved.

It may be understood that the processor 501 or the processor 601 may be a CPU, or an ASIC, or one or more integrated circuits that are configured to implement the embodiments in accordance with the present disclosure.

The memory 502 or the memory 602 may include a volatile memory such as a RAM; or the memory 502 or the memory 602 may include a non-volatile memory such as a ROM, a flash memory, an HDD, or an SSD; or the memory 502 or the memory 602 may include a combination of the foregoing types of memories.

The communications interface 503 or 603 may be configured to interact with an external communications device, and may be, for example, an air interface.

An embodiment of the present disclosure further provides a communications system, including the base station in the embodiment shown in FIG. 6 or the base station on which the chip set in the embodiment shown in FIG. 8 is installed, and the UE in the embodiment shown in FIG. 7 or the UE on which the chip set in the embodiment shown in FIG. 9 is installed. Communication may be performed between the base station and the UE by using an air interface. The base station may perform the resource allocation information indication method in the embodiment shown in FIG. 2, and the UE may perform the resource allocation information obtaining method in the embodiment shown in FIG. 3. For specific content, refer to related description in another embodiment of the present disclosure. Details are not described herein.

It may be understood that the embodiments provided in the present disclosure may be referenced mutually. For example, the base station in the embodiment shown in FIG. 6 may perform the method in the embodiment shown in FIG. 2, and the UE in the embodiment shown in FIG. 7 may perform the method in the embodiment shown in FIG. 3. The methods in the embodiments shown in FIG. 2 and FIG. 3 are technical solutions corresponding to two communications ends, and are performed by corresponding communication devices at the two ends.

It may be understood that the terms "first" and "second" in the embodiments in accordance with the present disclosure are intended to only distinguish different description objects but do not represent an order or advantages and disadvantages of the description objects. This does not impose any limitation on the embodiments in accordance with the present disclosure.

It may be understood that "multiple" in the embodiments in accordance with the present disclosure refers to two or more than two.

It may be clearly understood by a person skilled in the art that, for the purpose of convenient and brief description, for a detailed working process of the foregoing device and module, reference may be made to a corresponding process in the foregoing method embodiments.

In the several embodiments provided in the present application, it should be understood that the disclosed device and method may be implemented in other manners. For example, the described apparatus embodiment is merely an example. For example, the module division is merely logical function division and may be other division in actual implementation. For example, a plurality of modules or components may be combined or integrated into another device, or some features may be ignored or not performed.

In addition, functional modules in the embodiments in accordance with the present disclosure may be integrated into one processing module, or each of the modules may exist alone physically, or two or more modules are integrated into one module.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

Finally, it should be noted that the foregoing descriptions are merely example embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A resource allocation information indication method, comprising:

generating, by a base station, downlink control information, wherein the downlink control information comprises public resource allocation indication information, wherein the public resource allocation indication information is used to indicates resources allocated to multiple pieces of user equipment (UE) including a first UE; and sending, by the base station, the downlink control information to the first UE;

wherein the public resource allocation indication information comprises a character string comprising binary codes;

the character string comprises a first substring, the first substring indicates consecutive resources allocated to the first UE, and at least two consecutive bits comprised in the first substring represents the consecutive resources allocated to the first UE; and the character string further comprises at least one second substring, the at least one second substring indicates consecutive resources allocated to at least one UE other than the first UE, and at least two consecutive bits comprised in the second substring represents consecutive resources allocated to one UE in the at least one UE other than the first UE; and, wherein the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

2. The method according to claim 1, wherein when the public resource allocation indication information comprises multiple second substrings, the multiple second substrings comprise alternate arrangement of a second substring comprising consecutive binary codes 1 and a second substring comprising consecutive binary codes 0.

3. The method according to claim 1, wherein the method further comprises:

scrambling a cyclic redundancy check code of the downlink control information by using identification information of the first UE.

4. The method according to claim 1, wherein that the public resource allocation indication information is used to indicate resources allocated to multiple pieces of UE including the first UE comprises:

the public resource allocation indication information is used to indicate a resource block group allocated to the first UE, and the resource block group comprises at least one resource block.

5. The method according to claim 4, wherein the method further comprises:

determining, by the base station, a length of the public resource allocation indication information, wherein the determining comprises:

determining the length of the public resource allocation indication information according to a size of total resources allocated to the multiple pieces of UE and a quantity of resource blocks included in the resource block group, wherein a quantity of UE indicated by the public resource allocation indication information is proportional to the length of the public resource allocation indication information.

6. A base station, comprising:

a processor, configured to generate downlink control information, wherein the downlink control information comprises public resource allocation indication information, wherein the public resource allocation indication information is used to indicates resources allocated to multiple pieces of user equipment (UE) including a first UE; and a transmitter, configured to send the downlink control information to the first UE;

wherein the public resource allocation indication information comprises a character string comprising binary codes;

the character string comprises a first substring, the first substring indicate consecutive resources allocated to the first UE, and at least two consecutive bits comprised in the first substring represents the consecutive resources allocated to the first UE; and the character string further comprises at least one second substring, wherein the at least one second substring indicates consecutive resources allocated to at least one UE other than the first UE, and at least two consecutive bits in the second substring represents consecutive resources allocated to one UE in the at least one UE other than the first UE; and, wherein the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

7. The base station according to claim 6, wherein when the public resource allocation indication information comprises multiple second substrings, the multiple second substrings comprise alternate arrangement of a second substring comprising consecutive binary codes 1 and a second substring comprising consecutive binary codes 0.

8. The base station according to claim 6, wherein the processor is further configured to:

scramble a cyclic redundancy check code of the downlink control information by using identification information of the first terminal.

9. The base station according to claim 6, wherein that the public resource allocation indication information is used to indicate resources allocated to multiple pieces of UE including the first UE comprises:

the public resource allocation indication information is used to indicate a resource block group allocated to the first terminal, and the resource block group comprises at least one resource block.

10. The base station according to claim 9, wherein the processor is further configured to determine a length of the public resource allocation indication information, wherein the determining comprises:

determining the length of the public resource allocation indication information according to a size of total resources allocated to the multiple pieces of UE and a quantity of resource blocks included in the resource block group, wherein a quantity of UE indicated by the public resource allocation indication information is proportional to the length of the public resource allocation indication information.

11. A chip set, comprising a processor and a memory, wherein, the memory is configured to store a group of program code, and the processor is configured to invoke the program code stored in the memory, to perform the following operations:

generating downlink control information, wherein the downlink control information comprises public resource allocation indication information, wherein the public resource allocation indication information indicates resources allocated to multiple pieces of user equipment (UE) including a first UE; and sending the downlink control information to the first terminal; and, wherein the public resource allocation indication information comprises a character string comprising binary codes, wherein the character string comprises a first substring, the first substring indicates consecutive resources allocated to the first UE, and at least two consecutive bits in the first substring represents the consecutive resources allocated to the first UE; and the character string further comprises at least one second substring, wherein the at least one second substring indicates consecutive resources allocated to at least one UE other than the first UE, and at least two consecutive bits in the second substring represents consecutive resources allocated to one UE in the at least one UE other than the first UE; and, wherein the first substring is consecutive binary codes 1, and the second substring that is adjacent to the first substring is consecutive binary codes 0; or the first substring is consecutive binary codes 0, and the second substring that is adjacent to the first substring is consecutive binary codes 1.

12. The chip set according to claim 11, wherein when the public resource allocation indication information comprises multiple second substrings,
the multiple second substrings comprise alternate arrangement of a second substring comprising consecutive binary codes 1 and a second substring comprising consecutive binary codes 0.

13. The chip set according to claim 11, wherein the processor is further configured to:
scramble a cyclic redundancy check code of the downlink control information by using identification information of the first terminal.

14. The chip set according to claim 11, wherein that the public resource allocation indication information indicates resources allocated to multiple pieces of UE that comprise the first terminal, wherein
the public resource allocation indication information indicates a resource block group allocated to the first UE, the resource block group comprising at least one resource block.

* * * * *